United States Patent

[11] 3,597,639

[72] Inventor Leopold Albert Harwood Somerville, N.J.
[21] Appl. No. 884,227
[22] Filed Dec. 11, 1969
[45] Patented Aug. 3, 1971
[73] Assignee RCA Corporation

[54] PHASE SHIFT CIRCUITS
16 Claims, 2 Drawing Figs.

[52] U.S. Cl. .......... 307/262, 178/5.4 HE, 328/133, 328/155, 330/300
[51] Int. Cl. .......... H03k 1/12
[50] Field of Search .......... 307/232, 262, 295; 328/109, 55, 133, 155; 330/30 D; 178/5.4 P, 5.4 HE

[56] References Cited

UNITED STATES PATENTS

| | | | |
|---|---|---|---|
| 2,909,594 | 10/1959 | Schlesinger .......... | 178/5.4 HE |
| 3,284,713 | 11/1966 | Bailey .......... | 307/295 X |
| 3,287,628 | 11/1966 | Keiper, Jr. .......... | 307/295 X |
| 3,294,900 | 12/1966 | Kool .......... | 178/5.4 HE |
| 3,454,708 | 7/1969 | Curtis et al. .......... | 178/5.4 HE |
| 3,512,098 | 5/1970 | Avins .......... | 330/30 D |

*Primary Examiner*—Stanley T. Krawczewicz
*Attorney*—Eugene M. Whitacre

ABSTRACT: A signal is applied to an input of a differential amplifier including two active devices. The amplifier is biased so that each active device has approximately an equal current flowing therethrough.

A portion of the signal developed at the output of the first device is applied to an impedance coupled to the output of the second active device. This impedance therefore has current flow due to said signal developed at the output of said first device, and due to the signal of a different phase developed at the output of the second active device. A variable impedance path is also coupled to the output of said second device and serves to control the magnitude of current through said resistor due to the signal developed at the output of said second active device. This control enables the phase of the vector sum of the two signals to vary in accordance with the magnitude of the signal as controlled by the variable impedance means.

INVENTOR.
Leopold A. Harwood
BY [signature]
ATTORNEY

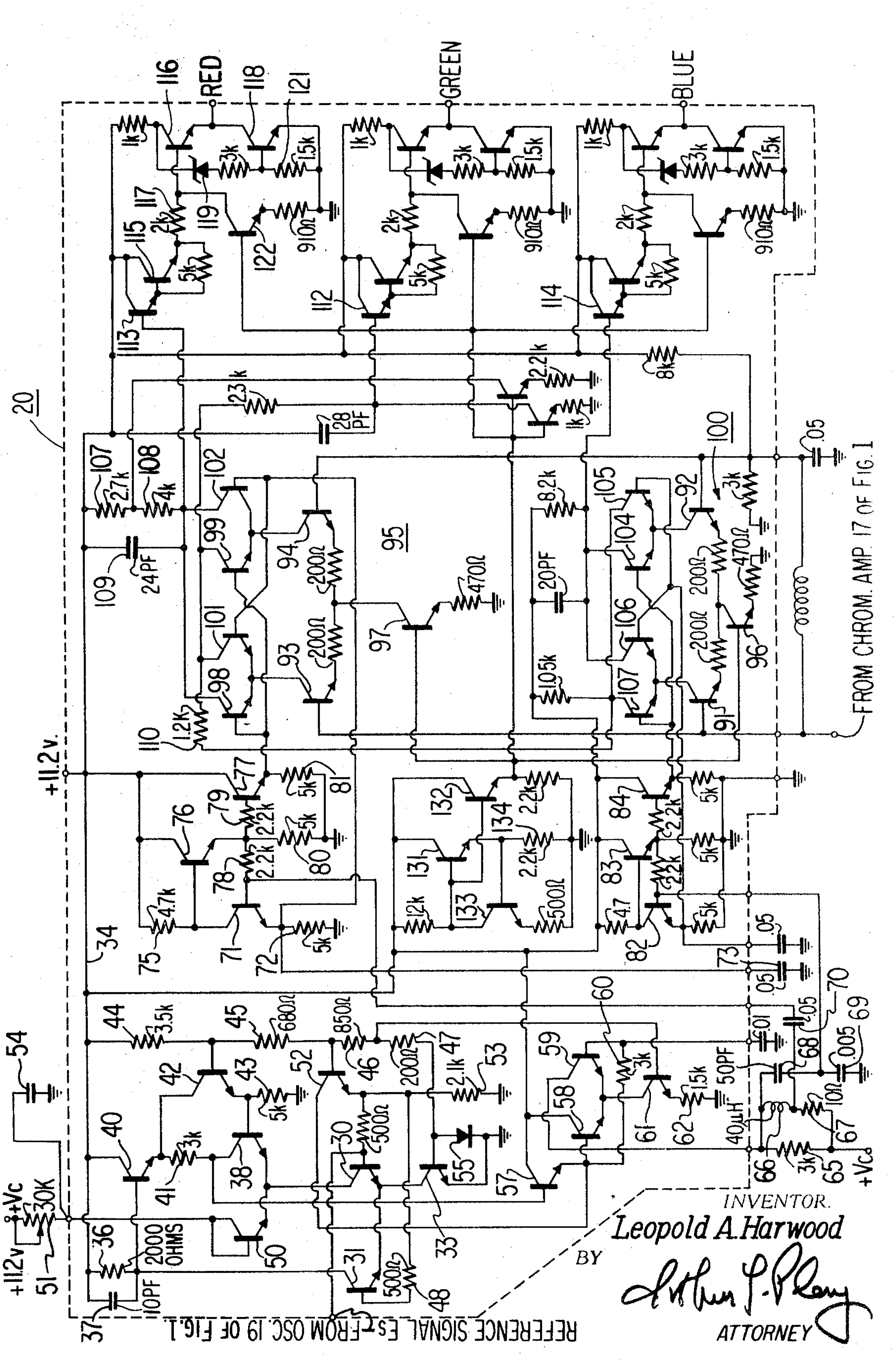
INVENTOR.
Leopold A. Harwood
BY
ATTORNEY

PHASE SHIFT CIRCUITS

This invention relates to phase shifting circuits and more particularly to such circuits for use in the chrominance channel of a color television receiver. The circuit configurations are particularly adapted to integrated circuit techniques.

In a color television receiver it is desirable to have a control which serves to vary the phase of the chrominance signals with respect to the color oscillator signal or vice versa, prior to the application of such signals to the demodulators. Such a control serves to produce a change in the hue or tint of the display according to the preference of the viewer.

The prior art is replete with circuits for providing tint control. Such circuits utilize variable capacitors, inductors, and resistors, or combinations thereof, for providing a phase change over a given range.

In the integrated circuit environment variable components are difficult to implement, and in general, difficult to utilize, except in certain "offboard" configurations. However, a prime concern of the integrated circuit art is to provide a function with a minimum of terminals associated with the integrated circuit chip for interfacing with the external environment.

Another desirable feature to be incorporated with a tint or phase control network is to provide the desired amount of phase shift upon application to the circuit of a specified DC voltage. In this manner, such a circuit can be easily adapted for remote control activation without the need to provide mechanically variable components.

Due to the limits of the phase angle control as affecting tint and, therefore, the picture quality; reliable centering of the tint range is desired without dependence upon the exact magnitude of the supply potential or temperature drifts. Furthermore, a desirable feature of the tint control arrangement is to provide a range of suitable phase variation without an accompanying change in amplitude of the signal components as demodulators.

It is, therefore, an object of the present invention to provide an improved phase control circuit operable to vary phase in accordance with a varying DC control signal.

A further object is to provide an improved phase control circuit exhibiting a reliable operating range relatively independent of temperature and power supply variations.

Another object is to provide an improved phase control network for use as a tint control circuit in a color television receiver, particularly adaptable to integrated circuit techniques.

These and other objects are provided by a differential amplifier arrangement employing a first and second active device each having an input, output and common electrodes. The common electrodes are coupled together and returned to a point of reference potential. The output electrode of the first active device is coupled to two different controllable, current conducting paths. The amount of total current through the device is substantially the sum of currents through both paths. A first one of said current paths is coupled to the output electrode of said second active device for application thereto of a signal of a phase determined by the phase of the signal at said output electrode of said second active device. Means coupled to the other path serves to vary the current therethrough and therefore the manner in which the total current is proportioned. A voltage at the output of the first device can then assume a plurality of different phase angles according to the proportioning of current through the current paths for application of a signal to be phase shifted to the input electrode of one of said active devices.

The invention may be best understood by referring to the following specification and drawings, in which:

FIG. 2 is a detailed schematic diagram of the integrated circuit chip shown in FIG. 1.

Figure 1:
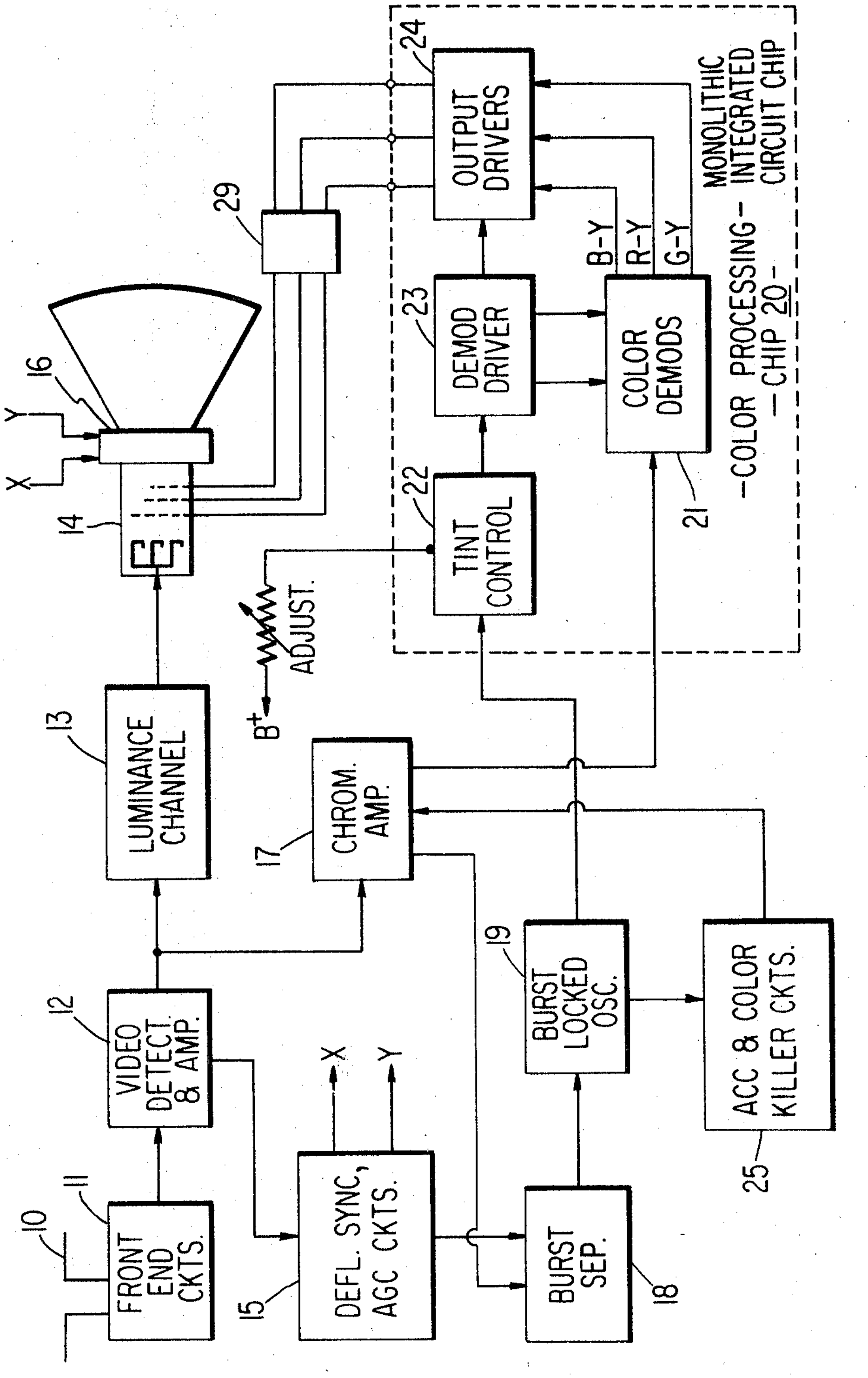
FIG. 1 is a schematic diagram in block form of a color television receiver employing an integrated circuit arrangement including a phase shift circuit according to this invention.

Referring to FIG. 1, there is shown a schematic diagram in block form of a color television receiver utilizing a color processing integrated circuit chip employing a DC tint control according to this invention.

A television antenna 10 is adapted to receive radio frequency signal transmissions in the television band and couple such signals to the input terminals of a front end circuit 11. The circuit 11 conventionally selects and processes the RF signals to provide an intermediate frequency signal. The intermediate frequency signals are demodulated by the video detector and amplifier circuitry 12 to provide a video signal containing information pertinent to the final display content, including synchronization and other information.

The video signal is applied to a luminance amplifier channel 13 having an output for driving a color kinescope display device 14. Video signals from the luminance channel 13 are applied to synchronization, deflection and automatic gain control circuitry 15 to assure the formation of a stable raster by the kinescope 14, in providing synchronized vertical and horizontal waveshapes to the deflection coil 16 associated with the kinescope 14. The circuitry 15 may further provide suitable operating potentials for the kinescope 14, which may be a three gun shadow mask device.

The video signal is also applied to a chrominance channel having a chrominance amplifier stage 17 for processing and amplifying the higher frequency components of the composite signal, containing the chrominance sidebands transmitted with the composite signal during a color transmission. An output from the chrominance amplifier 17 is coupled to an input of a burst separator amplifier 18. The function of the burst separator amplifier 18 is to respond to a gate pulse, generated by the deflection circuits 15 and in synchronism with the horizontal retrace interval, to provide an amplified version of the oscillatory burst signal transmitted along with the composite signal during a color transmission. The output of the burst separator 18 is coupled to an input of an oscillator 19. The oscillator 19 is synchronized to the burst, as received, in order to provide an output signal useful for reliable demodulation of the chrominance subcarrier components transmitted with the composite signal and representative of the color content of the scene.

Generally speaking, the output of the locked oscillator 19, and the output of the chrominance amplifier 17 are applied to suitable demodulator circuits in the receiver where they are synchronously demodulated to provide color difference signals or color signals representative of the colors transmitted by the station. The output of the chrominance amplifier 17 is applied to the color processing integrated circuit (IC) chip 20 and it is coupled to an input of circuitry located thereon and indicated in block diagram form as color demodulators 21. The output signal of the burst locked oscillator 19 is also applied to the color processing integrated circuit chip 20 by coupling the output terminal of the oscillator 19 to an input of the circuit referenced as tint control 22.

The function of the tint control circuit 22 is to alter the phase of the burst locked oscillator 19 signal, to provide the viewer with means for adjusting the relative hue of the picture. Alternatively, phase control may be provided by altering the phase of the chrominance signals and the disclosed embodiments may be utilized in this manner as well. Hue or tint control is pertinent to the reproduction of flesh tones as well as other colors generated on the viewing screen of the kinescope 14. The output of the tint control 22 is coupled to suitable demodulator driver amplifiers 23 for application to suitable inputs of the color demodulator 21. The function of the color demodulators 21, as indicated briefly above, is to demodulate the chrominance subcarrier frequency components, transmitted with the composite signal, with respect to suitable phases of the color oscillator signal to provide at an output thereof the color difference signals which are conventionally the B—Y, R—Y, and G—Y signals. The color difference signals are applied to output driver amplifiers 24 for subsequent application to suitable amplifier or isolating stages 30 and thence for application to electrodes, such as the grid electrodes of the kinescope 14.

The above noted functions are those which are ordinarily supplied by many conventional television receivers utilizing discrete components; as well as those receivers which may utilize integrated circuit components. The invention concerns itself with techniques applicable to the color processing integrated circuit chip 20 for providing a convenient means of tint control for the oscillator reference signal prior to demodulation; while further describing suitable biasing and driving techniques for amplifier configurations necessary for proper operation of balanced demodulator circuits utilized on the integrated circuit chip 20.

The typical problems which were alluded to in the beginning of this specification and are of concern to the integrated circuit designer concern temperature stability, power supply dependence and the conservation of terminals. The solutions to such techniques as utilized to circumvent certain problems will be more clearly described if reference is made to FIG. 2, which is a detailed schematic diagram of the color processing integrated circuit chip 20 utilized as shown in FIG. 1.

The output from the oscillator 19, shown in FIG. 1, is applied to an input of a transistor 30 which forms part of a differential amplifier with the transistor 31. The differential amplifier configuration includes a constant current source transistor 33 having a collector electrode coupled to the emitter electrodes of transistors 30 and 31. The emitter electrode of transistor 33 is returned to the point of reference potential. A bias arrangement for the constant current source transistor 33 is provided by the series resistors 44, 45, 46, and 47 coupled between the base electrode of transistor 33 and the source of operating potential or supply bus 34. A diode 55 coupled between the base electrode of transistor 33 and ground serves to determined the current bias of transistor 33 and the overall temperature stability. Transistor 31 of the differential amplifier has its collector electrode returned to the positive supply bus 34 via a resistor 36 which is shunted by a capacitor 37. The RC network provides a reference phase angle for the tint control circuit to be described subsequently.

The collector electrode of transistor 30 is coupled to the emitter electrode of a transistor 38 for providing a collector load to transistor 30. The collector of transistor 38 is coupled to the emitter electrode of a transistor 40 via a resistor 41. Transistor 40 is arranged in an emitter follower configuration and has its collector electrode coupled to the positive supply bus 34.

The base electrode of transistor 40 is coupled to the junction of the collector electrode of transistor 31 and resistor 36 for supplying operating bias to transistor 40. Transistor 40 serves to transform the signal source as evidenced by the voltage across the RC network into a low impedance voltage source for coupling to the collector electrode of transistor 38. The emitter electrode of transistor 40 is further coupled to the collector electrode of a biasing transistor 42, having its emitter electrode coupled to the base electrode of transistor 38 for supplying an operating bias thereto and returned to ground through resistor 43. Biasing for the base electrode of transistor 42 is obtained through the common divider used for biasing the constant current source transistor 33, by means of resistors 44 and 45 forming part of the above noted divider. Transistor 42 serves to prevent transistor 40 from undesirably operating as a detector for low level signals.

The emitter electrode of transistor 38 is coupled to the emitter electrode of transistor 50 having the base and collector electrodes connected together and, therefore, operated in a diode configuration. The diode formed by utilizing the transistor in this manner matches the base to emitter diodes of the transistors utilized on the integrated circuit chip and serves to aid in temperature tracking and biasing stabilization. The common terminal formed by coupling the base electrode to the collector electrode of transistor 50 is coupled to an external potentiometer 51 having a terminal thereof coupled to a source of operating potential designated as $+V_c$, and relatively of the same magnitude as that potential applied to the bus 34. The potentiometer 51 is bypassed for chrominance signal frequencies by capacitor 54.

The function of resistor 51 is to determine the amount of current flowing through the collector to base connected transistor 50 which in turn determines the amount of current flowing through transistor 38. This control serves to provide phase shifts by operating on the vector currents or complex currents developed by the differential amplifier circuit using transistors 30 and 31 in conjunction with the biasing arrangement. This particular operation will be described in greater detail subsequently.

Transistor 38 provides at its collector electrode a signal which is representative of the oscillator reference signal as phase shifted according to the setting of potentiometer 51. The collector electrode of transistor 38 is coupled to the base electrode of a transistor 57 arranged in an emitter follower configuration and used to drive a limiting differential amplifier including transistor 58 and 59. The emitter electrode of transistor 57 is direct coupled to the base electrode of transistor 58 and to the base electrode of transistor 59 via resistor 60. Transistor 58 drives transistor 59 via the emitter connection and the output collector electrode of transistor 59 is connected to the $+V_c$ supply via resistor 65. Transistor 59 in conjunction with the magnitude of resistor 65 and the drive applied to the emitter electrode thus provides a large and constant amplitude voltage swing between the $+V_c$ supply and the collector to emitter saturation voltage of transistor 59 for varying magnitude input signals. The differential amplifier therefore serves to thus limit the signal to provide a constant amplitude signal at the output for a wide range of different amplitude input signals.

Biasing for the limiting differential amplifier comprising transistors 58 and 59 is afforded by a constant current source transistor 61 arranged in a common collector configuration and having its collector electrode coupled to the junction between the emitter electrodes of transistors 58 and 59. The emitter electrode of transistor 61 is referenced to ground through a resistor 62 while the base electrode is biased from the above mentioned voltage divider by coupling the base electrode thereof to the junction between resistors 46 and 47. The collector electrode of transistor 59 is also coupled to an external network used for producing the proper phased reference signals for the driver stages prior to demodulation of the chrominance subcarrier signals. The external circuit is the series combination of inductor 66 and resistor 67 shunted by the series capacitors 68 and 69 to obtain the adequate reference signals each of which is approximately 90° out of phase with one another. These reference signals are applied to the demodulators according to phase to enable the generation of the appropriate color difference signals. As in any demodulator, the axis of demodulation is dependent upon the phase of the reference signal supplied to cause synchronous demodulation. By changing the phase of the reference signals with respect to each other one can demodulate on a different axis as the I or Q axis and so on.

The network is suitably tapped between capacitors 68 and 69 and at the junction between inductor 66 and resistor 67 to provide two desired signals of a given phase and amplitude. The junction between inductor 66 and resistor 67 is coupled to the base electrode of a transistor 71 via the coupling capacitor 70. Transistor 71 forms part of a DC biasing and AC driving circuit for the balanced transistor demodulators which will be described subsequently. Transistor 71 is arranged in an amplifier configuration having its emitter electrode returned to the point of reference potential through resistor 72 which is bypassed for chrominance subcarrier frequencies by capacitor 73. The collector electrode of transistor 71 is returned to the $+V_c$ supply bus 34 via resistor 75. The collector of transistor 71 is also direct coupled to the base electrode of a transistor 76 arranged in a common collector configuration. The emitter electrode of transistor 76 is coupled to the base electrodes of transistors 71 and 77, respectively via resistors 78 and 79. The resistors 78 and 79 are selected to be approximately of the same magnitude. The emitter electrode of transistor 76 is further returned to the point of reference potential through a resistor 80 which together with resistors 78 and 79 determines the DC split at the respective emitter electrodes of transistors 71 and 77. Transistor 77 is arranged in a common collector configuration having its collector electrode direct coupled to the $+V_c$ supply bus 34 and its emitter electrode returned to ground through a resistor 81.

The other phased signal of the reference oscillator taken from the junction between capacitors 68 and 69 is applied to an identical amplifier used for driving another balanced demodulator circuit. The amplifier comprises the amplifier transistor 82, the emitter follower drive and biasing transistor 83 and the common collector stage 84 having its base electrode coupled to the emitter electrode of transistor 83. The output terminals of both the above mentioned demodulator driver circuits are taken respectively from the emitter electrodes of transistors 71 and 77 for the aforementioned stage and from the emitter electrodes of transistors 82 and 83 for the later mentioned stage. The emitter of transistor 71 is bypassed for signal by the 0.05 microfarads capacitor and the output signal with respect to the AC ground reference at the emitter of transistor 71 is developed across the emitter of transistor 77.

The integrated circuit chip utilizes two doubly balanced demodulators 95 and 100 for developing the R—Y and B—Y color difference signals from the chrominance subcarrier components and the suitable phased reference oscillator signals.

Chrominance signals are applied to the base electrodes of transistors 91 and 93 with respect to the AC ground at the base electrodes of transistors 92 and 94. Transistors 91 and 92 form a differential amplifier with transistor 96 biased as a constant current source. Transistors 93 and 94 form a second differential amplifier configuration with transistor 97 biased as a constant current source.

The constant current source transistors 96 and 97 are biased from the amplifier supply configuration including transistor 131 arranged in an emitter follower configuration. Transistor 131 has the emitter electrode returned to ground through a resistor 134 and coupled to the base electrode of transistor 133 arranged in a common emitter configuration. Transistor 133 has the collector electrode direct coupled to the base electrode of transistor 131 and directly coupled to the base electrode of an output emitter follower transistor 132. The emitter electrode of transistor 132 supplies biasing current for the constant current transistors 96 and 97 used in the doubly balanced differential amplifiers.

The differential amplifiers provide opposite phased chrominance signals at the collector electrodes of transistors 91 and 92, 93, 94 which are applied to the emitter electrodes of switching transistors controlled by the suitably phased reference oscillator signal. For example, the output emitter electrode of transistor 77 is direct coupled to the base electrode of transistor 98 and transistor 99, utilized as switching transistors in the differential demodulator circuit 95.

The emitter electrode of transistor 71 is coupled to the base electrodes of transistors 101 and 102 which in conjunction with transistors 98 and 99 form the switching transistor network for the differential demodulator 95. Chrominance signals as described previously are applied between the base electrodes of transistors 93 and 94 forming the differential amplifier configuration.

In a similar manner, the demodulator 100 receives a suitable oscillator signal by the coupling of the emitter electrode of transistor 84 to the base electrodes of transistors 103 and 104. The AC reference is applied to the base electrodes of the switching transistors 105 and 106 by coupling the bypassed emitter electrode of transistor 82 to the base electrodes of transistors 105 and 106.

A load impedance for the doubly balanced demodulator 95 is obtained by the coupling of the resistors 107 and 108 to the collector electrodes of transistors 102 and 98. The load resistance is shunted by a capacitor 109 which determines the frequency response of the demodulator 95.

In operation, the switch transistors 98, 99, 101, and 102 are controlled by the suitable phased reference oscillator signal to determine which of the chrominance signal currents flows into the load impedance of the differential demodulator 95. The chrominance signals being applied between the base electrodes of transistors 93 and 94 for demodulator 95.

The doubly balanced demodulator configuration provides inherent cancellation of the fundamental reference signal and the chrominance signals thus eliminating the need for additional filtering networks at the output terminal of the demodulator. Demodulator 100, as indicated above, is the same type as demodulator 95 and operates in the same manner, but with a different phased reference oscillator signal to provide the appropriate color difference signal.

By utilizing two demodulators on the integrated circuit chip as shown, two color difference signals are provided. The third signal required is obtained by matrixing the two signals produced in suitable proportions.

Matrixing is provided by resistor 110 coupled between the collector electrode of transistor 101 and the collector electrode of transistor 107 and resistor 111 coupled between the collector electrode of transistor 101 and the base electrode of a transistor 112 used as an input stage for a matrixed color difference signal output amplifier. The proper ratio of signals for matrixing is determined by the magnitude of resistors 110 and 111 aid the impedance between the base electrode of transistor 112 and reference potential.

Each of the generated color difference signals is applied to a suitable amplifier before interfacing with the external environment. Each of the amplifiers (three) comprises a Darlington configuration having a first transistor 112, 113, and 114, respectively for each of the three circuits.

For example, the collector electrode of transistor 102 is coupled to the base electrode of transistor 113 arranged in a Darlington configuration with the transistor 115. The emitter electrode of transistor 115 is coupled to the base electrode of transistor 116 via a resistor 117. Transistor 116 forms part of a power amplifier with transistor 118, having the collector electrode thereof coupled to the emitter electrode of transistor 116. To provide a stabilized output impedance over a large dynamic range, transistor 118 has the base electrode thereof biased by coupling the collector electrode of transistor 116 to the base electrode of transistor 118 via a zener diode 119 in series with the resistor 120. A further resistor 121 is coupled between the base electrode of transistor 118 and ground to complete the biasing circuit for the power amplifier. The output of the power amplifier is obtained between the emitter electrode of transistor 116 and the collector electrode of transistor 118.

As can be seen from the figure, the demodulator 100 has a similar output driver amplifier as does the matrixed color difference network.

OPERATION OF THE TINT CONTROL NETWORK

The constant current source transistor 33 supplies a current to the differential amplifier transistors 30 and 31. Each transistor 30 and 31 is biased quiescently so that they conduct current approximately equal to one another the sum of both being equal to the reference current supplied by the constant current source transistor 33. Transistor 33 is biased by resistors 44, 45, 46, and 47 connected between the $+V_c$ supply bus 34 and the base electrode of transistor 33, and by diode 55 connected between the base electrode and the point of reference potential. The base current is stabilized by the diode 55 for temperature and voltage variations and is equal to the current flowing through the collector to emitter path of transistor 33, which is approximately:

$$\text{Total Id.c.} = \frac{+V_c - V_{be}}{R44 + R45 + R46 + R47}$$

where $V_c$ = potential at supply bus 34

$Vbe$ = voltage drop across diode 55 which is equal to voltage drop from base to emitter of transistor 33.

With the biasing shown, the quiescent DC current in each of the differential transistors 30 and 31 is equal to one-half the value of the total current, Id.c.

The reference signal $E_s$ from the oscillator is applied to the base electrode of transistor 30. The currents flowing due to signal $E_s$, through the collector electrodes of transistors 30 and 31 are equal in magnitude but opposite in phase, due to the differential action.

The collector current flowing through transistor 30 is divided into two current paths, one through the diode connected transistor 50 and the other through transistor 38. The exact current division is a function of the setting of resistor 51, determining how much of the current is contributed via the diode path and how much through the transistor 38. The AC signal current is bypassed at the junction of resistor 51 with the collector and base electrodes of the diode connected transistor 50, by means of capacitor 54.

As indicated, the phase shifted output signal is taken from the collector electrode of transistor 38, and is developed as follows. The voltage developed across the RC network comprising resistor 36 and capacitor 37 is equal to the transconductance (gm) of the transistor 31 multiplied by the input signal $E_s$ as phase shifted 180°, and the complex impedance comprising resistor 36 and capacitor 37. This voltage is represented by a vector having a phase angle determined by the RC network forming the complex impedance. The voltage developed across resistor 41 coupled to the collector electrode of transistor 38, due to the input signal $E_s$ is approximately equal to the input signal $E_s$ multiplied by the transconductance, (gm) of transistor 30 times a factor K (less than one), the whole term multiplied by the magnitude of resistor 41. The factor K is adjusted by resistor 51 as determining the current division between transistor 38 and the transistor connected diode 50.

Since the signal developed across the RC network as described above, is applied to the base electrode of transistor 40 whose emitter is coupled to transistor 38 via resistor 41, the output voltage is proportional to the vector sum of the voltage at the base or emitter of transistor 40 and the voltage across the resistor 41.

The output signal is then approximately equal to:

$Eo = E1 + E2$ where $$E_0 = Es\ (gm)\ [(KR - |Z_1|e^{j\theta})]$$

$Eo$ = Voltage between at the collector electrode of transistor 38 and a point of reference potential $E1$ = Voltage across RC network, resistor 36 and capacitor 37

$E2$ = Voltage across resistor 41

$\cong Es\,(\text{gm})\,KR$ where:

$Es$ = signal voltage gm = transconductance of transistors 30, and 31.

$K$ = current division factor between transistor 38 and transistor connected diode 50.

$|Z_1|$ = absolute magnitude of the impedance of resistor 36 in parallel with capacitor 37

$e$ = natural logarithm $\theta$ = phase angle determined by resistor 36 in parallel with capacitor 37.

$R$ = magnitude of resistor 41

Since the factor K is adjustable according to the setting of potentiometer 51, the phase angle of the output signal $Es$ is adjustable as being determined by the $KR$ term plus the $$-|Z_1|e^{j\theta}$$

term; and will vary between the angle $\theta$ for $K=0$ and the angle formed by the complex vector when $K=1$.

The resultant obtained by adding complex vectors in the above described manner changes slightly in amplitude for changes in phase angle. However, the range of oscillator amplitude or input signal may vary greatly for different types of oscillator configurations. Therefore, for this reason the output taken from the collector electrode of transistor 38 is coupled to the base electrode of an emitter follower transistor 57, for driving the limiter including transistor 58 and transistor 59. Transistors 58 and 59 as previously described form part of the differential limiter amplifier configuration including the constant current source transistor 61.

This circuit with the signals provided will produce a reliable peak-to-peak amplitude signal for application to the phase determining network comprising inductor 66, resistor 67, in parallel with capacitors 68 and 69 as described above.

OPERATION OF THE DRIVE AND BIASING CIRCUITS FOR THE DIFFERENTIAL DEMODULATORS

The Drive and Biasing Circuits assure that the switching transistors used in the balanced demodulators are maintained at equal bias levels to assure reliably balanced operation.

The drive amplifier used to supply reference oscillator signals at the proper phase to the switching transistors 98, 99, 101, 102, for example, as utilized in demodulator 95, is a symmetrical circuit employing a negative feedback network capable of developing highly predictable DC potentials, by including a branch network with the DC potential essentially determined by the symmetry of the circuit. Negative feedback is obtained via transistor 71 and transistor 76. Transistor 71 includes a collector load resistor 75 and has its base electrode coupled to the emitter electrode of transistor 76 via resistor 78. The base electrode of transistor 76 is further coupled to the collector electrode of transistor 71 providing the negative feedback. The resistors 72, 75, 80, and 81 provide the necessary stabilization against power supply and temperature variations.

In operation, if the collector voltage of transistor 71 decreases due to the increase in collector current, the decrease in voltage is applied to the base electrode of transistor 76 which tends to reverse bias transistor 76, tending to make the emitter electrode of transistor 76 less positive. This action serves to decrease the base current in transistor 71, thus stabilizing the collector voltage variation.

The increase of current through transistor 71 also serves to increase the voltage across the emitter resistor 72 which also functions to stabilize the bias and therefore the collector voltage of transistor 71. This operation thereby stabilizes, the circuit operation against DC supply variations or current variations due to temperature changes. It is also noted that the DC voltage at the emitter electrode of transistor 71 and the DC voltage at the emitter electrode of transistor 77 are maintained relatively constant and track with each other as both voltages are controlled by the follower transistor 76.

Because of the equal magnitudes of resistors 78 and 79, as coupled to the base electrodes of transistor 71 and 77, and as energized by the connection of the emitter electrodes of transistor 76; the DC currents flowing in the transistors are virtually identical and track with any variations in voltage or temperature due to the action of transistor 76. Therefore, the bias supplied to the switching transistors 98 and 99 and 101 and 102 is held relatively constant and identical for both temperature and voltage variations.

As far as the AC gain of the amplifier is concerned, the emitter of transistor 71 is bypassed for AC signals by capacitor 73. The AC signal when applied to the base electrode of transistor 71 is amplified by the gain of the stage as determined by the transconductance of the transistor and its collector load resistor 75. This effective gain is available at the emitter of transistor 77 due to the coupling of the base electrode of transistor 77 to the emitter electrode of transistor 76 via resistor 79.

In essence, the full AC signal with the aforementioned gain is applied to transistors 98 and 99 via transistor 77. Due to the operation of the circuit the signal applied to transistors 98 and 99 is referenced back to the emitter of transistor 71 which is at AC ground. Thus the operation and application of the signals is in common to the differential mode operation of a typical differential amplifier assembly. When such an amplifier is driven by a single ended signal, it will provide a push-pull output signal by the emitter couplings as utilized, for example, in the above described arrangements of the differential transistor configurations.

As indicated previously, a similar driving circuit obtaining and utilizing the same properties of symmetry is also used in conjunction with demodulator 100 for supplying the proper bias and phase referenced oscillator signal thereto.

What I claim is:

1. Apparatus for varying the phase angle of a signal comprising, a. an amplifier circuit including first and second active devices having input, output, and common electrodes, said common electrodes coupled together and returned to a point of reference potential, b. means coupled to at least one of said input electrodes for applying said signal thereto, to provide at said output electrodes replicas of said signal of a different phase with respect to one another, c. means coupled to said output electrode of said first active device for providing first and second controllable current paths, said current through said first and second paths approximately equal to the total current through said first active device, d. means coupling the output electrode of said second active device to said first current path for applying said replica of said signal of said different phase thereto, and e. means coupled to said second controllable path for varying said second current for determining the division of said first and second currents as formulating said total current, and f. means coupled to said first current path responsive to said current flowing therethrough for providing a signal having a phase determined in accordance with said division.

2. Apparatus for varying the phase of a signal comprising, a. first and second transistors arranged in a differential amplifier configuration having the emitter electrodes thereof coupled together and returned to a point of reference potential, b. first means coupled to at least one of the base electrodes of said transistors for applying said signal thereto, to provide at each of said collector electrodes a replica of said signal and of a different phase with respect to one another, c. second means coupled to the collector electrode of said first transistor for shifting the phase of said signal appearing thereat by a predetermined amount, d. third means coupled to the collector electrode of said second transistor for providing first and second controllable current paths wherein each path as controlled serves with the other to direct current through the collector to emitter path of said second transistor, said current through said first and second paths being approximately equal to the total current through said second transistor including that current due to said signal applied to said base electrode, e. fourth means coupling said second means to said first controllable current path for applying at least a portion of said phase-shifted signal thereto, f. fifth means coupled to said second controllable current path for determining that portion of the total current supplied by said second current path and therefore by said first path, g. means coupled to said first controllable current path responsive to said current flowing therein to provide a signal having a phase determined in accordance with that portion of the total current supplied to said first path.

3. Apparatus for varying the phase of a signal comprising, a. first and second transistors arranged in a differential amplifier configuration having the emitter electrodes thereof coupled together and returned to a point of reference potential, b. first means coupled to at least one of the base electrodes of said transistors for applying said signal thereto, to provide at each of said collector electrodes a replica of said signal of a different phase with respect to one another, c. second means coupled to the collector electrode of said first transistor for providing first and second controllable current paths wherein each path as controlled serves with the other to direct current through the collector to emitter path of said first transistor, said current through said first and second paths being equal to the total current through said first transistor including that current due to said signal applied to said base electrode, d. third means coupling said collector electrode of said second transistor to said first controllable current path of said second means for applying at least a portion of said different phase signal thereto, e. fourth means coupled to said controllable current path for determining that portion of the total current supplied by said second current path and therefore by said first path, and f. means coupled to said first current path to provide a voltage thereacross having a phase angle determined by the amount of current flowing through said first path.

4. The apparatus according to claim 3 wherein said second means coupled to the collector electrode of said first transistor providing said first controllable current path comprises, a. a third transistor having a base, collector and emitter electrode, said emitter electrode coupled to said collector electrode of said first transistor, b. means for biasing said base electrode, c. means coupling said collector electrode of said third transistor to a point of operating potential, d. means coupled to said emitter electrode for varying the bias between said base and emitter electrodes and therefore varying said current through said first path.

5. The apparatus according to claim 3 wherein said second means coupled to the collector of said transistor providing said second controllable current path comprises, a. a unilateral current conducting device having a first and a second terminals and poled to conduct current from said first to said second terminal, said second terminal coupled to the emitter electrode of said third transistor b. a variable resistor coupled between said first terminal of said unilateral conducting device and a point of operating potential for varying the current conducted by said device according to the variation in magnitude of said resistor.

6. Apparatus for changing the phase of a signal of a predetermined frequency, comprising, a. a differential amplifier, including first and second transistors each having a base, collector, and emitter electrode, said emitter electrodes being coupled one to another, b. means coupled to at least one of said base electrodes for applying said signal thereto, to provide an amplified signal at said collector electrodes, c. a third transistor having a collector electrode coupled to said emitter electrodes of said first and second transistors and an emitter electrode returned to a point of reference potential, d. means coupled to the base electrode of said third transistor for biasing said transistor to conduct current via said collector to emitter path of a magnitude approximately equal to the current flowing through said collector to emitter paths of said first and second transistors, e. a phase shifting network coupled to the collector electrode of said first transistor for providing a given phase shift to said signal appearing at said collector electrode, f. means coupling said phase shifting network to the collector electrode of said second transistor for application of a portion of said given phase shifted signal thereto, to cause said phase shifted signal as applied to said collector electrode to vectorially add with respect to that signal present due to said signal applied to said base electrode, for providing a changed phase shifted signal at said collector electrode of said second transistor.

7. The apparatus according to claim 6 wherein said means coupled to the base electrode of said third transistor includes, a. a unilateral current conducting device coupled between the base electrode of said transistor and a point of reference potential and poled for easy current conduction in the same direction as said base to emitter junction of said transistor, and b. a resistor coupled between said base electrode and a point of operating potential.

8. The apparatus according to claim 7 wherein said phase shifting network comprises, a. a resistor coupled between said collector of said first transistor and said point of operating potential, b. a capacitor in parallel with said resistor for providing said given phase shift to said signal appearing at said collector electrode.

9. In combination:

a. first and second transistors arranged in a differential amplifier configuration, having the emitter electrodes coupled together, b. means coupled to said emitter electrodes for biasing said transistors for current conduction of a magnitude equal to a predetermined value which value is substantially the same for all signal conditions, whereby if the current through one of said transistors increases the current through said other transistor decreases to maintain said predetermined value relatively constant, c. a terminal adapted for application thereto of an operating potential, d. impedance means coupled between the collector electrode of said first transistor and said first terminal, e. a third transistor having a collector electrode coupled to said first terminal and a base electrode coupled to said impedance means, f. means coupling the emitter electrode of said third transistor to the collector electrode of said second transistor to form a first current path for said second transistor, g. a unidirectional current conducting device poled for current conduction between a first an second electrode in the same direction as said base to emitter junction of said third transistor, said second electrode being coupled to said collector electrode of said second transistor to form a second current path for said second transistor, h. variable impedance means coupled between said first electrode of said unidirectional current conducting device and said first terminal for varying the current flowing through said device and therefore through said first and second electrodes, said means thereby serving to determine that portion of current flowing through said second current path and therefore through said first current path, i. means coupled to the base electrodes of said first and second transistors for application of a signal thereto to cause the signal developed at the collector electrode of said first transistor to be applied to the base electrode of said third transistor for applying a current through said third transistor and therefore through said first current path; whereby the total current supplied by said second transistor as necessary to maintain said predetermined current value relatively constant is provided by said first and second current paths proportioned to conduct current according to the variation of said variable impedance means.

10. The combination according to claim 9 wherein said means coupled to said emitter electrodes of said first and second transistors comprises a. a fourth transistor having a collector electrode coupled to said emitter electrodes of said first and second transistors and an emitter electrode coupled to a point of reference potential, b. a unidirectional current device coupled between said base electrode of said fourth transistor and said point of reference potential, and poled for easy current conduction in the same direction as is said base to emitter electrode of said fourth transistor, c. means including at least one resistor coupling said base electrode of said fourth transistor to said terminal to cause said fourth transistor to conduct current via said collector to emitter path relatively equal to said predetermined value.

11. The combination according to claim 9 wherein said unidirectional current conducting device is a transistor having a base, collector and emitter electrode, and having each base electrode directly connected to said collector electrode, said collector to base connection being said first electrode and said emitter electrode being said second electrode,

12. The combination according to claim 11 wherein said variable impedance means comprises, a potentiometer coupled between said first terminal and said first electrode of said collector to base connected transistor.

13. Apparatus for varying the phase of a signal of a predetermined frequency comprising, a. a differential amplifier, including first and second transistors each having a base, collector, and emitter electrode, said emitter electrodes being coupled on to another, b. means coupled to at least one of said base electrodes for applying said signal thereto, to provide an amplified signal at said collector electrodes, c. a third transistor having a collector electrode coupled to said emitter electrodes of said first and second transistors and an emitter electrode returned to a point of reference potential, d. means coupled to the base electrode of said third transistor for biasing said transistor to conduct current via said collector to emitter path of a magnitude approximately equal to the current flowing through said collector to emitter paths of said first and second transistors, e. a phase shifting network coupled to the collector electrode of said first transistor for providing a given phase shift to said signal appearing at said collector electrode, f. means coupling said phase shifting network to the collector electrode of said second transistor for application of a portion of said given phase shifted signal thereto, to cause said phase shifted signal as applied to said collector electrode to vectorially add with respect to that signal present due to said signal applied to said base electrode, for providing a changed phase shifted signal at said collector electrode of said second transistor.

g. means coupled to the collector electrode of said second transistor for determining the magnitude of said signal to be vectorially added due to said signal applied to said base electrode, for providing said changed phase shifted signal at said collector electrode of said second transistor of changed phase determined in accordance with the magnitude of said signal.

14. Apparatus for varying the phase of a signal, comprising, a. first and second active devices each having input, output and common terminals, said common terminals connected together and returned to a point of reference potential, b. means coupled to at least one of said input terminals for application of said signal thereto, to provide at said output electrodes, replicas of said signal of a different phase with respect to tone another, c. a phase shift network coupled to said output terminal of said second device for providing at an output thereof said signal of a predetermined phase, d. means including a resistor coupling said output of said shift network to said output terminal of said first active device, e. variable impedance means coupled to said output terminal of said first active device for determining the amount of current that can flow through said resistor due to said signal applied to said input terminal, wherein said signal and said phase shifter signal appears across said resistor, f. means coupled to said resistor responsive to said signal and said phase shifted signal to provide another signal having a phase determined by the vector addition of such signals and therefore by the setting of said variable impedance means.

15. The apparatus according to claim 14 wherein, said means including a resistor comprises, a. a power amplifier having an input, output and common terminal said input terminal being coupled to said phase shift network, said output terminal coupling said resistor to said output terminal of said first active device, said common terminal adapted for receiving a source of operating potential.

16. The apparatus according to claim 14 wherein, said variable impedance means comprises, a. a unidirectional current conducting device having first and second electrodes and poled for easy current conduction between said first and second electrode, having said second electrode coupled to said output terminal of said first active device and b. a variable resistor coupled between said first terminal of said unidirectional device and a point of operating potential.

UNITED STATES PATENT OFFICE
CERTIFICATE OF CORRECTION

Patent No. 3,597,639 Dated August 3, 1971

Inventor(s) Leopold Albert Harwood

It is certified that error appears in the above-identified patent and that said Letters Patent are hereby corrected as shown below:

Column 1, lines 38-39, that portion reading "as demodulators" should read -- as applied to the demodulators --.

Column 3, line 38, that portion reading "determined" should read -- determine --.

Column 6, line 75, that portion of the formula reading "$-V_{be}$" should read -- -Vbe --.

Column 11, line 47, that portion reading "first an second" should read -- first and second --.

Column 12, line 30, that portion reading "coupled on to another" should read -- coupled one to another --.

Column 12, line 72, that portion reading "with respect to tone another" should read -- with respect to one another --.

Signed and sealed this 7th day of March 1972.

(SEAL)
Attest:

EDWARD M.FLETCHER,JR.
Attesting Officer

ROBERT GOTTSCHALK
Commissioner of Patents